Patented Aug. 13, 1940

2,211,623

UNITED STATES PATENT OFFICE 2,211,623

VULCANIZATION OF RUBBER

Joy G. Lichty, Stow, Ohio, assignor to Wingfoot Corporation, Wilmington, Del., a corporation of Delaware No Drawing. Application January 30, 1937, Serial No. 123,278

8 Claims. (Cl. 260—787)

This invention relates to the vulcanization of rubber. More particularly, it relates to the vulcanization of rubber in the presence of a material derived from a mercaptoarylthiazole and a halocyclohexanone. The use of these materials obtainable as hereinafter described, accelerates the vulcanization and yields rubber products of outstanding characteristics.

Many accelerators of vulcanization of rubber are known. It has now been discovered that a new class of materials of excellent characteristics for this purpose can be derived by reacting a halocyclohexanone and a mercaptoarylthiazole.

The halocyclohexanones which may be employed are those in which there is at least one halogen substituted alpha to the carbonyl group. These compounds may, however, contain other neutral or basic substituents which may vary the composition and structure of the compound without, however, greatly influencing its character. Thus the ring may contain in addition to the halogen substituent other groups such as alkyl, aralkyl, aryl, alicyclic, alkoxy, aryloxy, amino, hydroxyl, etc., groups and may also contain halogens in other than alpha positions, these halogens being relatively inactive and inert. While any alpha halocyclohexanone corresponding to this general description may be employed, the preferred compounds will be the chlor cyclohexanones. Chlor cyclohexanones representative broadly of the halocyclo hexanones may be in part exemplified by alpha-chlorcyclohexanone, α,α'-dichlorcyclohexanone, α,α-dichlorcyclohexanone, etc. However, due to the increasing instability of the derivative as the number of α-halo groups increases, the preferred materials are the monohalo- and dihalo-compounds. Even in these materials, there is some tendency for the derivatives to hydrolize but this disadvantage is counterbalanced by the excellent physical properties imparted to the rubber products vulcanized in the presence of these compounds.

The compounds of the invention may be prepared by reacting such chlorcyclohexanones with a mercaptoaryl thiazole in the form of an alkali metal salt. The following examples will demonstrate the preparation of the compounds:

Example 1.—A mixture of 0.275 mol of alpha chlorcyclohexanone, 0.3 mol of sodium benzothiazylmercaptide in 250 cc. of water and 100 cc. of acetone was refluxed for 15 minutes. Water was added to the cooled product. The heavy oil which separated was washed with water and dried in a vacuum desiccator over sulfuric acid. The yield was 64.9 grams or 90% of the theoretical. The equation representing the reaction is as follows:

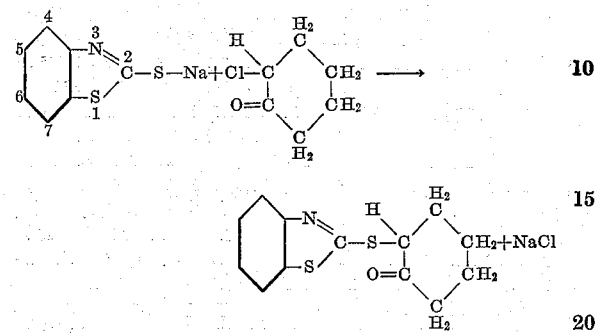

In this preparation a chlorcyclohexanone purified by distillation was employed but equally good accelerating properties were obtained by using the crude chlor cyclohexanone prepared by chlorinating cyclohexanone in the presence of an aqueous suspension of calcium carbonate until the chlorine content of the organic layer was equivalent to the chlorine content of monochlorcyclohexanone.

Example 2.—A mixture of methyl cyclohexanones was chlorinated in the presence of an aqueous suspension of calcium carbonate until the organic layer had the same chlorine content as a monochlormethyl cyclohexanone. Two tenths of a mol of this material which consisted chiefly of alpha-chlor methylcyclohexanone and 0.2 mol of sodium benzothiazylmercaptide were dissolved in 75 cc. of acetone and 150 cc. of water and refluxed for ½ hour. The product was poured into water. The oil separating was removed, washed with water, and dried over sulfuric acid. The yield was 45.7 grams or 83% of the theoretical.

Example 3.—Fifteen hundredths of a mol of dichlorcyclohexanone was added to 0.3 mol of sodium benzothiazylmercaptide in 150 cc. of water and 150 cc. of acetone while cooling and stirring. The mixture was allowed to stand overnight. Water was then added and a viscous oil separated.

This product was dried over sulfuric acid in a vacuum desiccator. The yield of brown, very viscous liquid was 59.6 grams or 93% of the theoretical.

Example 4.—Fifteen hundredths of a mol of methyldichlorcyclohexanone was added to 0.3 mol of sodium benzothiazylmercaptide in 150 cc. of water and 150 cc. of acetone. The mixture was refluxed for ½ hour, most of the acetone distilling off. The oily residue was separated and dried over sulfuric acid in a vacuum desiccator. The yield of brown, sticky material weighed 62 grams, which represented 93% of the theoretical yield.

In the foregoing examples, the sodium salt of 2-mercaptobenzothiazole was employed. Other reactive salts, preferably alkali metal salts, may be employed equally as well. Or the compounds of the invention may be prepared by any other method whatsoever, since they may be employed as accelerators independent of the method of preparation.

The dichlorcyclohexanones employed in the foregoing examples were prepared by the same process as the monochlor compounds of Examples 1 and 2. It is not known for certain whether these dichlor compounds are $\alpha,\alpha'$-substituted or $\alpha$-disubstituted but there is good reason to assume that they are one of these forms, i. e., that they are alpha chlorcyclohexanones.

Any other 2-mercaptoaryl thiazole may be used in place of 2-mercaptobenzothiazole. Exemplary of the class are the following compounds: 2-mercaptonaphthothiazole, 2-mercapto 6-nitrobenzothiazole, 2-mercapto 6-chlorbenzothiazole, 2-mercapto 4, 6-dichlorbenzothiazole, 2-mercapto 4-methyl benzothiazole, 2-mercapto 6-ethoxybenzothiazole, 2-mercapto 5-nitro 6-chlorbenzothiazole, 2-mercapto 4-hydroxybenzothiazole, 2-mercapto 4-phenylbenzothiazole, the 2-mercapto xylylthiazoles, and other alkyl, aryl-, aralkyl-, halo-, nitro-, hydroxy-, alkoxy-, aryloxy-, and other substituted 2-mercapto-arylthiazoles of the benzene and naphthalene series.

Samples of the materials prepared as in the foregoing examples were incorporated into rubber in accordance with the following formulae:

| A | | B | |
|---|---|---|---|
| | Parts | | Parts |
| Rubber | 100 | Rubber | 100 |
| Zinc oxide | 5 | Zinc oxide | 5 |
| Sulfur | 3 | Sulfur | 3 |
| Diphenylguanidine | 0.2 | Accelerator | 0.5 |
| Accelerator | 0.5 | | |

Samples prepared according to this formula were cured and tested to yield the following results:

PRODUCT OF EXAMPLE 1.—*Formula A using pale crepe*

| Cure, min./° | Tensile, lb./sq. in. | Elong., percent | Modulus | |
|---|---|---|---|---|
| | | | 500% | 700% |
| 20/260 | 93 | 920 | 11 | 28 |
| 40 | 120 | 790 | 20 | 68 |
| 60 | 144 | 780 | 23 | 85 |
| 80 | 159 | 780 | 24 | 91 |

PRODUCT OF EXAMPLE 2.—*Formula B using pale crepe*

| Cure, min./° | Tensile, lb./sq. in. | Elong., percent | Modulus | |
|---|---|---|---|---|
| | | | 500% | 700% |
| 40/260 no cure | | | | |
| 40/285 | 83 | 940 | 10 | 20 |
| 60 | 70 | 950 | 10 | 24 |
| 80 | 80 | 920 | 13 | 26 |
| 120 | 66 | 890 | 12 | 24 |

PRODUCT OF EXAMPLE 2.—*Formula A using smoked sheet*

| Cure, min./° | Tensile, lb./sq. in. | Elong., percent | Modulus | |
|---|---|---|---|---|
| | | | 500% | 700% |
| 20/260 | 129 | 860 | 16 | 55 |
| 30 | 149 | 800 | 22 | 84 |
| 40 | 153 | 770 | 26 | 102 |
| 60 | 169 | 760 | 30 | 120 |
| 80 | 184 | 760 | 33 | 129 |

PRODUCT OF EXAMPLE 3.—*Formula B using pale crepe*

| 40/285 | 87 | 890 | 12 | 29 |
|---|---|---|---|---|
| 60 | 100 | 900 | 13 | 33 |
| 80 | 98 | 880 | 14 | 35 |
| 120 | 94 | 900 | 14 | 30 |

PRODUCT OF EXAMPLE 3.—*Formula A using smoked sheet*

| 10/260 | 133 | 975 | 16 | 52 |
|---|---|---|---|---|
| 15 | 150 | 830 | 20 | 74 |
| 20 | 174 | 790 | 26 | 103 |
| 30 | 186 | 760 | 33 | 134 |
| 40 | 186 | 740 | 37 | 149 |

The foregoing data demonstrate the accelerating characteristics of the materials of the invention. Moreover, the rubber products obtained have very desirable properties, possessing outstanding resistance to flexing and abrasion. This latter property makes the materials of especially great value.

While in the foregoing description only the preferred forms of the invention have been described in detail it will be evident to one skilled in the art that numerous modifications may be made throughout without departing from the scope of the invention or the scope embodied in the claims in which it is intended to cover all patentable novelty inherent in the invention.

I claim:

1. The method of treating rubber which comprises vulcanizing the same in the presence of $\alpha$-(2-benzothiazylmercapto) cyclohexanone.

2. The method of treating rubber which comprises vulcanizing the same in the presence of $\alpha, \alpha'$-di(2-benzothiazylmercapto) cyclohexanone.

3. The method of treating rubber which comprises vulcanizing the same in the presence of a mixture of $\alpha$-(2-benzothiazylmercapto) cyclohexanones.

4. A rubber product which has been vulcanized in the presence of $\alpha$-(2-benzothiazylmercapto) cyclohexanone.

5. A rubber product which has been vulcanized in the presence of $\alpha, \alpha'$-di(2-benzothiazylmercapto) cyclohexanone.

6. A rubber product which has been vulcanized in the presence of a mixture of $\alpha$-(2-benzothiazylmercapto) cyclohexanones.

7. The method of treating rubber which comprises vulcanizing the same in the presence of alpha-(2-arylthiazylmercapto) cyclohexanone in which the aryl nucleus of the arylthiazyl radical contains substituents selected from the group consisting of hydrogen, halogen, and alkyl, aryl, aralkyl, nitro, hydroxy, alkoxy and aryloxy radicals and in which the cyclohexanone ring is saturated with elements and radicals selected from the group consisting of hydrogen, halogen, and alkyl, aralkyl, aryl, alicyclic, alkoxy, aryloxy, amino and hydroxyl radicals.

8. A rubber product which has been vulcanized in the presence of an alpha-(2-arylthiazylmercapto) cyclohexanone in which the aryl nucleus of the arylthiazyl radical contains substituents selected from the group consisting of hydrogen, halogen, and alkyl, aryl, aralkyl, nitro, hydroxy, alkoxy and aryloxy radicals and in which the cyclohexanone ring is saturated with elements and radicals selected from the group consisting of hydrogen, halogen, and alkyl, aralkyl, aryl, alicyclic, alkoxy, aryloxy, amino and hydroxyl radicals.

JOY G. LICHTY.